(12) United States Patent  
Havnør et al.

(10) Patent No.: US 10,679,057 B2  
(45) Date of Patent: Jun. 9, 2020

(54) METHOD AND DEVICE FOR AUGMENTING A PERSON'S VIEW OF A MINING VEHICLE ON A MINING WORKSITE IN REAL-TIME

(71) Applicant: MY VIRTUAL REALITY SOFTWARE AS, Oslo (NO)

(72) Inventors: Martin Havnør, Oslo (NO); Urban Mäder, Ebertswil (CH)

(73) Assignee: MY VIRTUAL REALITY SOFTWARE AS, Oslo (NO)

( * ) Notice: Subject to any disclaimer, the term of this patent is extended or adjusted under 35 U.S.C. 154(b) by 0 days.

(21) Appl. No.: 16/200,375

(22) Filed: Nov. 26, 2018

(65) Prior Publication Data

US 2019/0244023 A1 Aug. 8, 2019

(30) Foreign Application Priority Data

Dec. 13, 2017 (EP) .................................... 17206958

(51) Int. Cl.
| | |
|---|---|
| *G06K 9/00* | (2006.01) |
| *G06T 7/70* | (2017.01) |
| *E02F 9/26* | (2006.01) |
| *G06T 11/00* | (2006.01) |

(52) U.S. Cl.
CPC .......... *G06K 9/00664* (2013.01); *E02F 9/261* (2013.01); *G06K 9/00671* (2013.01); *G06K 9/00771* (2013.01); *G06K 9/00805* (2013.01); *G06T 7/70* (2017.01); *G06T 11/00* (2013.01); *G06K 2209/23* (2013.01); *G06T 2207/10004* (2013.01); *G06T 2207/30252* (2013.01)

(58) Field of Classification Search
CPC ............................. E02F 9/261; G06K 9/00771
See application file for complete search history.

(56) References Cited

U.S. PATENT DOCUMENTS

| | | | |
|---|---|---|---|
| 6,633,800 B1 * | 10/2003 | Ward ..................... | B60W 50/02 180/167 |
| 2013/0054133 A1 * | 2/2013 | Lewis .................. | G07C 5/0841 701/423 |
| 2013/0182066 A1 | 7/2013 | Ishimoto | |

(Continued)

OTHER PUBLICATIONS

Extended European Search Report dated Jun. 20, 2018 as received in Application No. 17 20 6958.

(Continued)

*Primary Examiner* — Ryan R Yang  
(74) *Attorney, Agent, or Firm* — Maschoff Brennan

(57) ABSTRACT

A method for real-time visualization of a risk zone of a mining vehicle to a person on a mining worksite for augmenting the person's current view of the mining vehicle including capturing with a camera a stream of pictures corresponding at least partly to the person's field of view, recognizing at least one mining vehicle in the picture stream by means of image processing, extracting image data of the mining vehicle from the picture stream, calculating, based on the image data and on preset vehicle risk zone data, at least one risk zone of the mining vehicle adapted to the person's current view of the mining vehicle, and visualizing the risk zone on a person's display such that the person's current view of the mining vehicle is overlayed in real-time with the visualization of the risk zone.

7 Claims, 9 Drawing Sheets

(56) References Cited

U.S. PATENT DOCUMENTS

2013/0222573 A1* 8/2013 Onuma .................... E02F 9/24
　　　　　　　　　　　　　　　　　　　　348/82
2016/0343163 A1　11/2016　Venkatesha et al.
2017/0220863 A1　8/2017　Lection et al.

OTHER PUBLICATIONS

Kim K., et al., "Image-based construction hazard avoidance system using augmented reality in wearable device", Automation in Construction, Elsevier, Amsterdam, vol. 83, pp. 390-403 (Aug. 10, 2017).

* cited by examiner

METHOD AND DEVICE FOR AUGMENTING A PERSON'S VIEW OF A MINING VEHICLE ON A MINING WORKSITE IN REAL-TIME

CROSS-REFERENCE TO RELATED APPLICATIONS

This application claims priority to European Patent Application No. 17206958, filed on Dec. 13, 2017. The foregoing patent application is incorporated herein by reference.

FIELD OF INVENTION

The present invention pertains to a method for real-time augmentation of a person's perception of a mining vehicle on a mine by visualization of a risk zone around the mining vehicle. The invention also pertains to an augmented reality display device for performing said method.

BACKGROUND

Heavy machinery such as hauling trucks, excavators or bucket-wheel excavators are a constant risk factor for workers or other personal or other machinery or vehicles on a mining worksite. Each year, thousands of accidents happen in the mining industry, whereby about three quarters of them involve some sort of mining equipment, most of them mining vehicles. Protective clothing can provide only a delimited protection as the forces effected by such heavy and often very huge machinery are enormous.

Whilst efforts are made to design mining vehicles with respect to better safety standards, these approaches are costly and especially limited as the basic functionalities of these apparatus always will pose a risk. On the other side, efforts are made by safety tutorials to instruct mining workers accordingly to better recognize and avoid risks. However, many situations happen in the field, where the risk a vehicle is posing is difficult to assess to a person as for example the vehicle's velocity and thus the risk resulting form the vehicle's movement is hard to evaluate correctly.

Assisting working personal by technical means for security reasons are known in the art. For example, document US 2013/182066 A1 discloses a device for surveying the surround of a working machine such as a hydraulic excavator to survey for the purpose of safety. Therein, it is suggested to provide the working vehicle with a plurality of cameras, monitoring risky zone as the backward of the machinery or other zones blind for the vehicle's operator. However, an operator may nevertheless overlook a person present in a risk zone or perceiving a person in the risk zone may occur to late to prevent injury or accident.

There is thus a need for a method and device to assist a person on a mining field in evaluating or recognizing in real time risk zones caused by mining vehicles of its surrounding, particularly with the objective of avoiding the person's entry in such a risk zone and/or warning him or the mining vehicle's operator in due time.

BRIEF DESCRIPTION

It is therefore an object of the present invention to provide a method for real-time presentation of risk zones of mining vehicles to a person on a mining worksite.

It is moreover an object to provide an according augmented reality display device system.

At least one of these objects is achieved by the method according to claim 1, the augmented reality display device according to claim 13 and/or the dependent claims of the present invention.

Some embodiments of the invention relate to a method for augmenting a person's current view of at least one mining vehicle on a mining worksite in real-time. The method comprises the steps of:
  capturing with a camera a stream of pictures of the mining worksite, preferably a video stream, with the camera's field of view corresponding at least partly to the person's field of view (the camera's view of the mining worksite is at least roughly the same as the person's view, realized for example in that the camera is mounted to a person's helmet or glass, whereby preferably the camera's field of view is larger than that of the person),
  recognizing at least one mining vehicle in the picture stream by means of image processing,
  extracting image data of the mining vehicle from the picture stream,
  calculating, based on the image data and on preset vehicle risk zone data, at least one risk zone of the mining vehicle adapted to the person's current view of the mining vehicle, and
  visualizing the risk zone on a person's display such that the person's current view of the mining vehicle is overlayed in real-time with the visualization of the risk zone.

According to some embodiments of the invention, actual live images of the mining vehicle, which correspond more or less to the view of the user of the mining vehicle, and pre-information of a risk zone of the mining vehicle are used to establish and display a live risk zone in some form of graphics of the mining vehicle directly in the field of view of the user, matched to his view of the mining vehicle.

Preferably, the visualization of the risk zone is dynamically adapted to changes of the person's current view and/or changes of the mining vehicles position relative to the person by continuous execution of the method (or particularly by recalculation and revisualization of the risk zone). Then, the person always has a live and actual visual view of the risk zone as augmented reality.

Preferably, the step of calculating a risk zone comprises generating at least one geofence. Geofences are known in the art and can for example be used to trigger an event if someone crosses the geofence. The geofence takes for instance the form of a virtual fence that is used to trigger alarms, messages etc such as popping up information on the person's display based upon the location of the relative position of the person to the geofence. As an option, the geofence is a mobile geofence, that is a geofence that moves with a moving mining vehicle or moving mining vehicle's structures.

As another preferred option, all method steps are performed by a user wearable device. Thus, the person in the field resp. on the worksite can profit of the method according to the invention independently of any external system or device, especially independently of any computer network, and the execution of the method can not be disturbed by any failure of an external computing device or communication line. Said feature does not exclude receiving data from external sensors such as GPS-signals or data transferred from the mining vehicle itself as described below. Preferably, in any further developed method according to the invention which makes use of such external sensor data, any malfunction of data transmission is automatically compensated by falling back to a more basic method according to the invention performed without relying on such external data.

Preferably, in course of the claimed method, a position and/or orientation of the mining vehicle relative to the person is determined. Calculating the risk zone is then additionally based on the relative position and/or orientation determined as describe above. The relative position and/or orientation are for example derived from the image data, e.g. based on two or more pictures of the picture stream using known techniques such as feature extraction and matching and deriving direction/angle information thereof using known properties of the camera and/or based on an object with known real geometrical properties (size, length, shape etc) serving as reference scale, whereby the corresponding properties in the image are determined. Such an object can be for example the mining vehicle itself if its real dimensions and/or orientation information are known to a calculation unit with which the method is performed (e.g. using a mining vehicle database). Alternatively or additionally, a position is determined based on a distance measurement, for example using known laser range meters build in the augmented reality display device with which the method is performed and/or with help of a global navigational satellite system (GNSS) of the device and/or the mining vehicle.

As another option, an entry of the person into the risk zone is determined based on the relative position determined as described above and in consequence an, preferably acoustic or visual, alert is automatically given to the person and/or the mining vehicle, informing the person itself or another person or system of the entry into the risk zone. Additionally or alternatively, an order is automatically given to the mining vehicle (or if the person is operator of another mining vehicle himself an order to his own mining vehicle) as a reaction to the entry. Such an automatically triggered order is for example the order to stop one or all of its risk zone related activities, for example by stopping one or all of the mining vehicle's systems, or to change speed or moving direction.

According to an embodiment of the method, calculating of the risk zone is additionally based on a real-time parameter of the mining vehicle. Preferably, the real-time parameter is an operating state (e.g. grade of activity), a velocity and/or moving direction of the mining vehicle and/or of an actuator or structure of the mining vehicle (in other words, the parameter refers to the mining vehicle as a whole or to one of its subelements). As another option, the parameter is derived from the image data and/or from a sensor monitoring the mining vehicle, whereby the sensor is for example one build in the mining vehicle (such as its speedometer) or built in the augmented reality device, measuring the vehicle at distance contactlessly.

As a further option, the risk zone visualization depends on a mining vehicle class, look of the mining vehicle, particularly its color, and/or the velocity or moving direction of the mining vehicle or one of its movable structures. For example, different types of risk zone overlays are generated and displayed depending on the class of mining vehicle such as "excavator" or "haulage vehicle" of depending on the individual vehicle. As another example, the color of the vehicle is determined from the image data and the color of the overlay is chosen accordingly.

In a further preferred embodiment, the method comprises a predictive component in that a future risk zone is calculated and visualized based on a, particularly real-time, parameter of the mining vehicle and/or the person. Hence, not or not only the actual risk zone is displayed but a risk zone that warns the user of risk that will occur in the near future, enabling considering it for instance for planning waypoints or future actions. The parameter is for example a future operating state of the mining vehicle and/or a movement parameter, specifically velocity and/or direction, of the mining vehicle and/or of the person. As a further option, a time of occurrence of the future risk zone and/or a time of occurrence of a (potential) collision is calculated and visualized on the display, enabling even better planning or assessment of the future risk. If more than one (moving) vehicle is present, a time of an overlap of risk zones of the different vehicles is optionally calculated and visualized on the display.

As another option, recognizing at least one mining vehicle comprises recognizing a class of mining vehicle and the preset vehicle risk zone data is class specific data. Alternatively or additionally, recognizing at least one mining vehicle comprises recognizing an individual mining vehicle and the preset vehicle risk zone data is data specific for the individual mining vehicle.

In preferred embodiments, calculating a risk zone comprises subdividing the risk zone in subzones of different risk grades, particularly comprising a subzone of high risk and/or a no-go area, giving the person an even better or finer visual impression of risks in his surrounding resp. on the mining worksite and/or allowing better evaluation of acceptable risks and of risks to avoid at all circumstances. Preferably, visualization of a risk zone comprises displaying different subzones with different overlays, for example different types of overlays, visually clearly indicating for example high, middle and low risk e.g. with different shapes or graphical boundaries between the risk zones or with different colors or color gradient.

As a further option, the method comprises coincident or parallel or simultaneous calculation and visualization on the operator's display of the risk zones of multiple, particularly all, mining vehicles in the person's current view or field of view, wherein the visualization of some or all risk zones is activatable and deactivatable by the person. The user than can decide on himself if a risk zone of one of the mining vehicles really concerns himself or not. In further enhanced methods, the deactivation is automatically disabled following an automatically risk evaluation if it is evaluated that deactivation of the visualization would impose a too high risk for the person. Additionally or alternatively, a deactivated risk zone is automatically reactivated and displayed according to an automatic risk assessment. As another option, the visualization comprises different sorts of overlays, specifically with respect to color or form, for different vehicles and/or different vehicle classes, enabling a better discrimination of risk zone for the user.

Where appropriate, any additional or improved method step described herein with respect to the initial risk zone is not only applicable to this basic risk zone, but also applicable to any additional, future risk zone or subzone or any risk zone somehow derived therefrom.

In further embodiments, the method comprises calculating and visualizing of at least one additional risk zone wherein the additional risk zone is resulting from an activity of the mining vehicle. Hence, the additional risk zone is not directly related to the mining vehicle itself but results from on of its actions. For instance, the risk zone may indicate risk resulting from an earthmoving procedure of an excavator, the alteration of the mining ground or flying rocks imposing risks to a person or vehicle conducted by the person walking or driving on the ground nearby.

As an alternative or additional option, the method according to the invention comprises additionally visualizing extracted image data of the mining vehicle such that an artificial live view of the mining vehicle is visualized on the display, whereby the image date can be modified or improved compared to the picture "raw data", using known image editing procedures. Thus, the person views for example an overlay of the mining vehicle in addition or instead of his real view of the mining vehicle. Such an approach is for example useful if the real view of the mining vehicle is (partly) disturbed or obscured, e.g. due to dust, bad lighting conditions or objects in the line of sight. In addition, previously stored image data of the mining vehicle is optionally referred to visualize an artificial view of the mining vehicle. As a further option, image data of a mining vehicle and/or its risk zone in the vicinity of the person but not in the person's current view (e.g. in its rear) is visualized on the person's display, e.g. in a separate display window. Thus, the person can be aware of additional risks. Therefore, the augmented reality display device can comprise additional cameras or a camera with a wide viewing angle which take a stream of pictures not only of the person's field of view but of his sides, rear and/or above him.

In further embodiments, the method comprises visualization on the display of at least one additional information about a parameter of the mining vehicle, for example its health or status, for example in form of 2D or 3D graphics and/or in text form. Optionally, the additional information is visualized as an info box attached to the person's view of the mining vehicle. As another option, the visualization is interactive, for instance such that the person can interact or expand the visualization resp. the info box to display more detailed information such as a detailed status or health report. The option of interactive visualization is in some embodiments likewise given for the visualization of the risk zone, for example such that a person can push a virtual button attached to a displayed risk zone to retrieve more detailed information about the risk zone and/or the underlying mining vehicle. As another option, visualization is interactive in that the person can use it to communicate with the mining vehicle or a central server, for example by pushing a virtual button attached to the mining vehicle in the user's augmented view or the method comprises the step of communicating with the mining vehicle using information visualized on the display, preferably risk zone related information.

In further embodiments, the method comprises capturing at least one range image of the mining vehicle, wherein calculating of the risk zone is also based on the at least one range image. Preferably, the camera is built as a RIM-camera adapted to capture the range image, particularly adapted to capture a multitude of range images while capturing the picture stream. The range image is optionally used to determine a position of the person relative to the mining vehicle as described above.

Some embodiments of the present invention also relate to an augmented reality display device adapted for augmenting a person's current view of a mining vehicle on a mining worksite in real-time. The device comprises a camera for capturing a picture stream, particularly a video stream, the camera being aligned such that the camera's field of view corresponds at least partly to the person's field of view. The device further comprises an image recognition and extraction unit that is adapted to recognize a mining vehicle in the picture stream by means of image processing and to extract image data related to the mining vehicle from the picture stream. Further, the device comprises a risk zone calculation unit that is adapted to determine, based on the image data and on preset vehicle risk zone data, at least one risk zone of the mining vehicle adapted to the person's current view of the mining vehicle. Additionally, the device comprises a graphic display unit that is adapted to create and visualize a graphics of the risk zone on a display of the device and to overlay the graphics in real time on the person's current view of the mining vehicle.

Optionally, the device comprises a detector for determining the position and/or orientation of the device relative to the mining vehicle, for example a laser range meter, a RIM-camera and/or a stereoscopic camera system. As another option, the device has a user interface adapted to enable the person to interact with information, particularly the risk zone, visualized on the display, for example by displaying virtual buttons or touch pads, attached to a risk zone or other information graphic or text boxes. As another option, the device comprises a wireless communication unit for communication with the mining vehicle, particularly wherein the device is configured such that information visualized on the display is used for communication, for example in that the overlay of a risk zone is interactive in that the person can "touch" the overlay to open communication with the according mining vehicle. As another option, the device comprises an additional or second camera being aligned such that the camera's field of view is substantially different from the person's field of view, for example the camera taking a steam o pictures of the mining worksite in the back or to the side or above of the person.

Some embodiments of the present invention further relate to a computer program product having program code which is stored on a machine-readable medium, preferably of a augmented reality display device according to the invention, or embodied as an electromagnetic wave, the program code being configured to control and carry out the method according to the invention.

Some embodiments of the present invention advantageously provide a method and device for augmenting a person's view of a mining vehicle by visualizing in real time a risk zone of the mining vehicle. This invention provides a live graphical view of a pedestrian or driver of another vehicle in the field resp. on the mining worksite, equipped with an according augmented reality device display, of a zone of danger around a mining vehicle and thus allows for easily reckon the actual risk in the mining environment and adapting his actions or plans to the risk and if applicable to interact or communicate with the mining vehicle. Optional embodiments of the invention provide even more functionalities such a geofence, enhanced live view of the mining vehicle, enhanced visualizations of the risk zone, visualization of additional information or improved calculation and visualization of one or more risk zones by determining and considering further parameters.

BRIEF DESCRIPTION OF THE DRAWINGS

The invention in the following will be described in detail by referring to exemplary embodiments that are accompanied by figures, in which:

FIG. 9b shows an exemplary visualization using the augmented reality display device of FIG. 9a.

DETAILED DESCRIPTION

In FIGS. 1a-1e, the method for augmenting a person's view of a mining vehicle 1 on mining worksite 50 is illustrated.

Figure 1A:
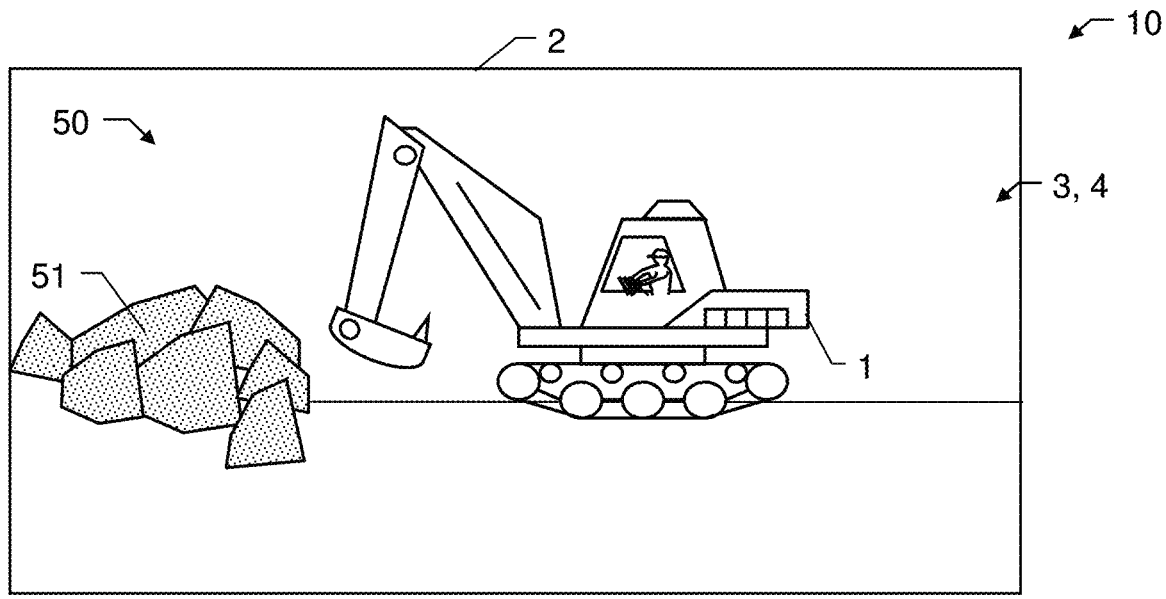
FIGS. 1a-e show schematically an example of the method according to the invention.

FIG. 1a illustrates capturing 10 of a stream of images. The figure shows the mining worksite 50 as it is perceived by the person, for example a mine worker, and by a camera of a augmented reality display device, such as Google Glass, a head mounted display (HMD) or a smartphone (cf. FIG. 2). The camera is aligned such that the camera's view 4 corresponds with the person's view 3 of the worksite. On the mining worksite 50, a mining vehicle 1, in the example an excavator, is operating on a pile of stones 51. The camera takes a stream of pictures 2 of the worksite 50 (for simplicity, only one picture is shown).

Figure 1B:
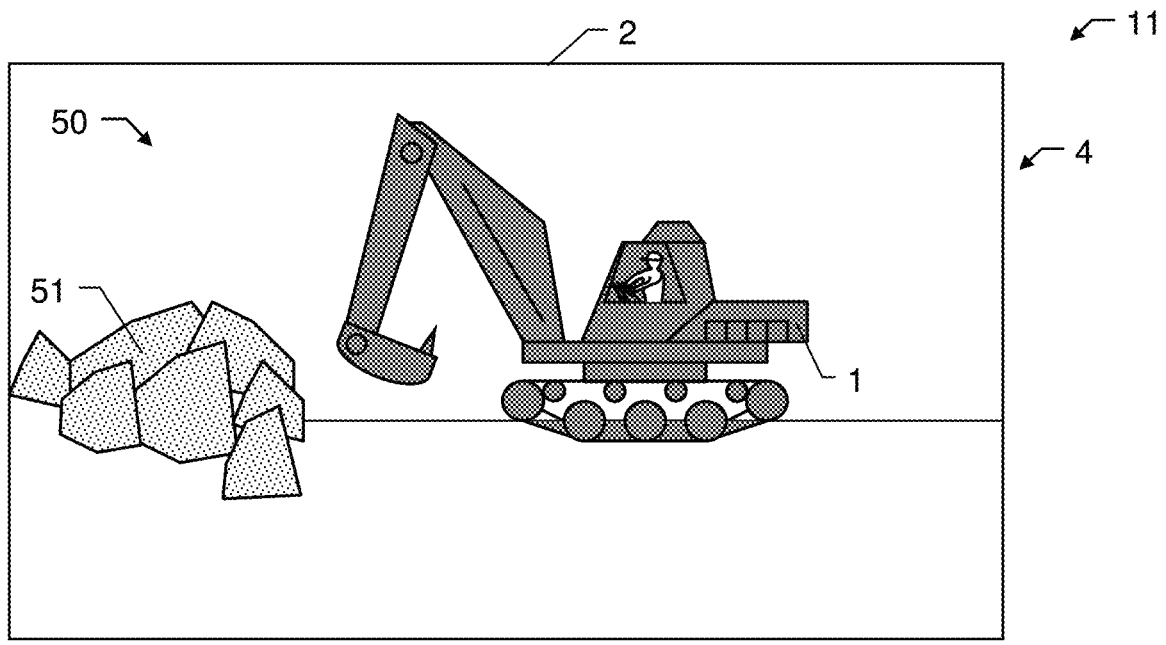

FIG. 1b illustrates recognizing 11 the mining vehicle 1 in the picture stream 2. By means of image processing, the mining vehicle 1 is determined in the picture 2, signalized in FIG. 1b by the grey filling of the mining vehicle 1. The image processing for vehicle recognition is for example based on a bag-of-features-algorithm or other classification algorithms, and/or on features such as geometric elements (line or arc segments or dominant lines etc.) and/or scale invariant descriptors, for example calculated using SURF- or SIFT-algorithms, and/or statistical features such as Histogram of Oriented Gradients, ORB, BRISK and so on, whereby features are for instance extracted using Hough transformation, Harris-Laplace-detector or Forstner-operator. Recognizing 11 may be a recognizing of a class of mining vehicle such as "excavator", "bull dozer" or "haulage vehicle" or may be recognizing of the individual mining vehicle such as "excavator No. 1", "bull dozer No. 13" etc.

Figure 1C:
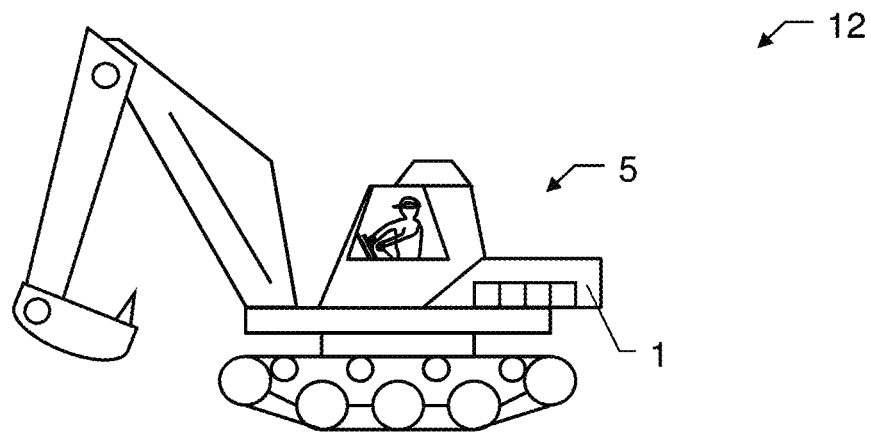

FIG. 1c illustrates the following step of extracting 12 image data 5 of the recognized mining vehicle 1. In the example, image data describing or representing the whole mining vehicle 1 is extracted from the image data of the whole picture 2 (see FIG. 1a). However, it can likewise be sufficient to extract image data of only parts of the mining vehicle 1, such as prominent points like corner points or prominent parts/features like the bucket of the excavator and/or its chassis.

Figure 1D:
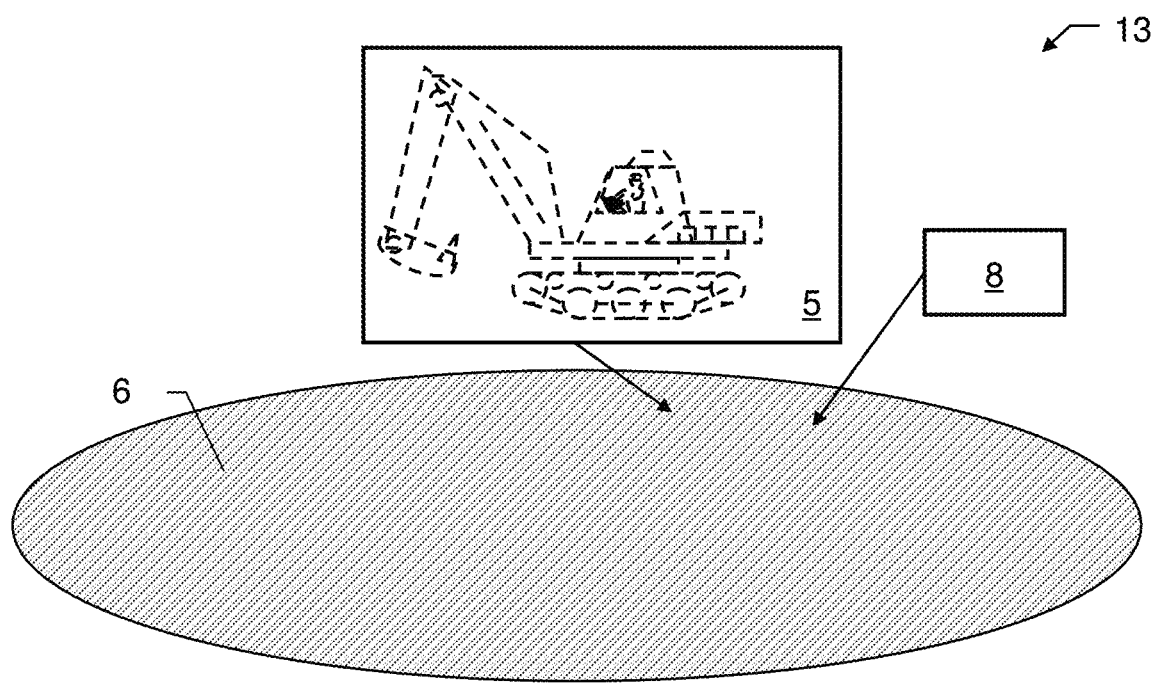

FIG. 1d illustrates the step of calculating 13 a risk zone 5 of the mining vehicle 1. The calculation 13 is based on the extracted image data 5 and on preset vehicle risk zone data 8. The risk zone 6 is calculated such that it is adapted to the person's current view of the mining vehicle 1. The preset vehicle risk zone data 8 may for example be simply a radius of a circle specific for a class of mining vehicles or specific for the individual mining vehicle 1, describing a circle around the mining vehicle 1 in the space of which a risk is given as for example a collision with the mining vehicle 1 may occur. In more sophisticated approaches, the preset data 8 describes one or more complicated geometric shape than a simple circle, for example an ellipse, a rectangle, a polygon, or 3D-forms or shapes with convexities taking into account overhanging vehicle parts such as cantilever arms. Using the extracted image data 5, the preset data 8 is fitted to the person's current view (the image data 5 results from the camera which has a view at least partly corresponding the person's view), for example in that the circle radius is fitted to the size of the mining vehicle 1 in the image and the circle is centered on the center of the vehicle 1. In the case of more sophisticated risk zone shapes, the pose or orientation of the mining vehicle 1 relative to the person/camera is optionally taken into account, such that the orientation of the risk zone 6 is matched to the orientation of the vehicle 1.

Figure 1E:
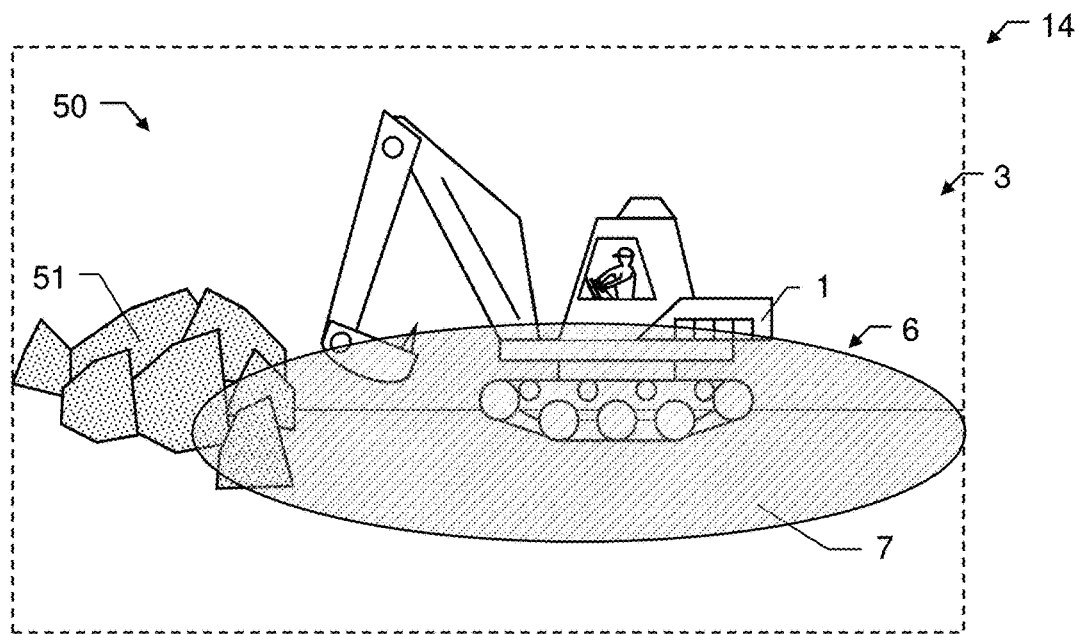

FIG. 1e illustrates the final step of visualizing 14 the risk zone 6 on a person's display (not shown), such as the display of a Google Glass or of a smartphone. In the example, the risk zone 6 is visualized as semi-transparent graphics 7 on the display such that the current view 3 of the person of the mining worksite 50 resp. the mining vehicle 1 (direct view if using a device like Google Glass or indirect view if using a device such as a smartphone) is augmented in real-time with the graphics 7 serving as an overlay on the mining vehicle 1 resp. the mining worksite 50, the graphics representing the risk zone 6.

Preferably, the visualization of the risk zone 6 is dynamically adapted to changes of the person's view 3 (changing of the viewing direction or field of view) and/or of the relative position of the mining vehicle 1 relative to the person, for example by a continuous determination of the viewing direction and/or relative position with sensor means as described below. The risk zone 6 then is calculated and displayed renewed, whereby the steps of recognizing of the vehicle and extracting image data of it are optionally additionally based on previous pictures as pre-information, which may facilitate or quicken image processing resp. the process.

Optionally, the derivation of the risk zone 6 comprises the generation of a geofence. Such a geofence is for example used to give out an alert to the person if entering or hitting the risk zone (like the overlay 7 starting blinking) or—if the person itself is operator of a second (mining) vehicle- to automatically stop or decelerate his vehicle or change its moving direction.

Figure 2:
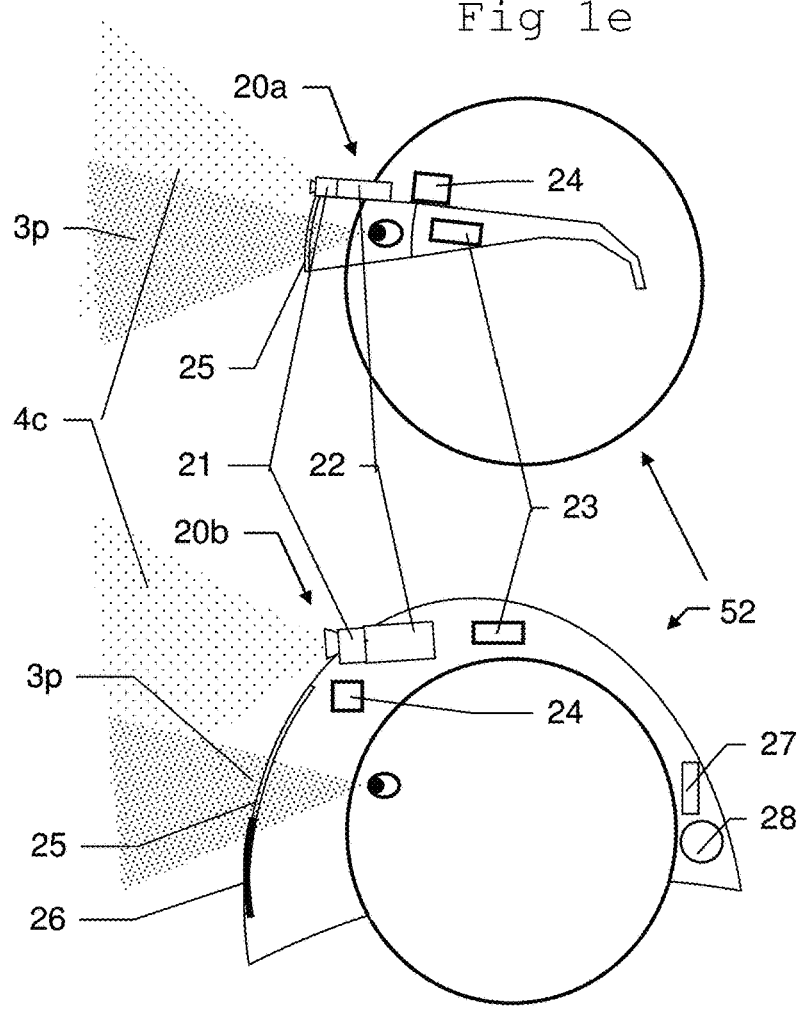
FIG. 2 shows two exemplary embodiments of an augmented reality display device according to the invention.

FIG. 2 shows two exemplary embodiments of an augmented reality display device 20a,b worn by the person 52 according to the invention. The first device 20a is embodied as a glass, the second device 20b as a helmet. The devices 20a, 20b each comprise a camera 21 for capturing a video stream, whereby the camera is aligned such that the camera's view 4c corresponds at least partly with the person's view 3p (their fields of view 4c, 3p overlap). The devices 20a,b further comprise a image recognition and extraction unit 22 for recognizing a mining vehicle and extraction image data of the mining vehicle as described above. Further, the devices 20a,b comprise a risk zone calculation unit 23 for determine at least one risk zone based on the image data and on preset risk zone data and a graphic display unit 24 for generating and visualizing a live graphic representation of the risk zone on the display 25 of the device 20a,b as described above. In the example, the graphics serves as an overlay on a transparent display 25 such that the person 52 sees "in nature" the mining vehicle and the virtual risk zone around it. Alternatively, the display 25 shows a live image or video stream of the mining vehicle resp. of the mining worksite as filmed by the camera 21 with the augmentation of the risk zone graphics. Alternatively to the integrated implementation of the units 22, 23 and 24 as shown, these units may be situated remote and connected to the camera 21 and display 25 by wireless connections.

The second device 20b additionally comprises a detector 28 for determining a position and/or orientation of the device 20b relative to the mining vehicle. The relative position or pose is either determined directly or indirectly by courtesy of a common reference system of both the device 20b and the mining vehicle. The detector is for example embodied as at least one of a GNSS-receiver, a compass, an IMU, a gyroscope or a 3-axis inclinometer. Additionally or alternatively, the detector 28 is embodied as an image analyzer that determines the relative position and/or pose by analyzing the image data of the mining vehicle as provided by the picture stream of the camera 21 (cf. FIG. 1c). A third option is to built the detector 28 as an optical video measuring sensor such as a camera system for passive triangulation (photogrammetry) or active triangulation with structured illumination of the mining vehicle, advantageously with the camera 21 as part of the detector 28. Preferably, the detector 28 is embodied as a range-image camera or RIM-camera (optionally as a common component with the picture camera 21) that takes range images of the mining vehicle, based on the principle of Time of Flight and/or phase measurement. Optionally, the relative position and/or orientation as determined is additionally used for calculating the risk zone, for example for better adaption to the person's current view 3 or for indicating a distance to the risk zone, whereby the indication may be done by different colors for different distances such as green=risk zone is far away, orange=risk zone is nearby and red=position of the person inside risk zone.

The exemplary device 20b further comprises a wireless communication unit 27 such as radio, bluetooth or WLAN receiver/transmitter for communication with the mining vehicle, either directly or indirectly through a server. The communication unit 27 is for example used to receive position information of the mining vehicle, determined for example by a GPS-receiver of the mining vehicle, or to transmit information regarding the risk zone. For instance if the person enters the risk zone (which is determined based on a relative position of the person and the mining vehicle, the relative position determined for example as described above), a signal for triggering an alert to the operator of the mining vehicle is transmitted or a signal triggering an order to the mining vehicle, particularly the order to stop one or all movements or activities of the mining vehicle.

Additionally, in the example the device 20b comprises a user interface 26 enabling interaction of the person 52 with information visualized on the display such as the graphic of the risk zone or other information relating to the mining vehicle, the device 20b or the mining worksite. The interface 26 is for example embodied as a touch sensitive surface or a virtual keyboard. As an example, the person 52 may zoom into the risk zone overlay or may open an info sheet for getting additional information such as the vehicles operating status, or the person may enter commands for the device 20b or (via wireless communication module 27) for the mining vehicle.

Figure 3A:
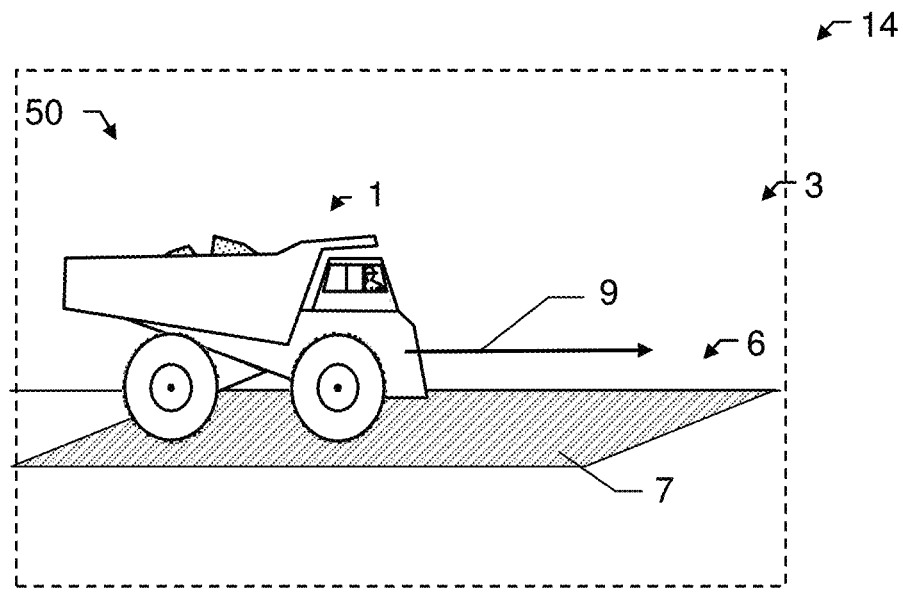
FIGS. 3a-b show schematically two further examples of the method according to the invention.
Figure 3B:
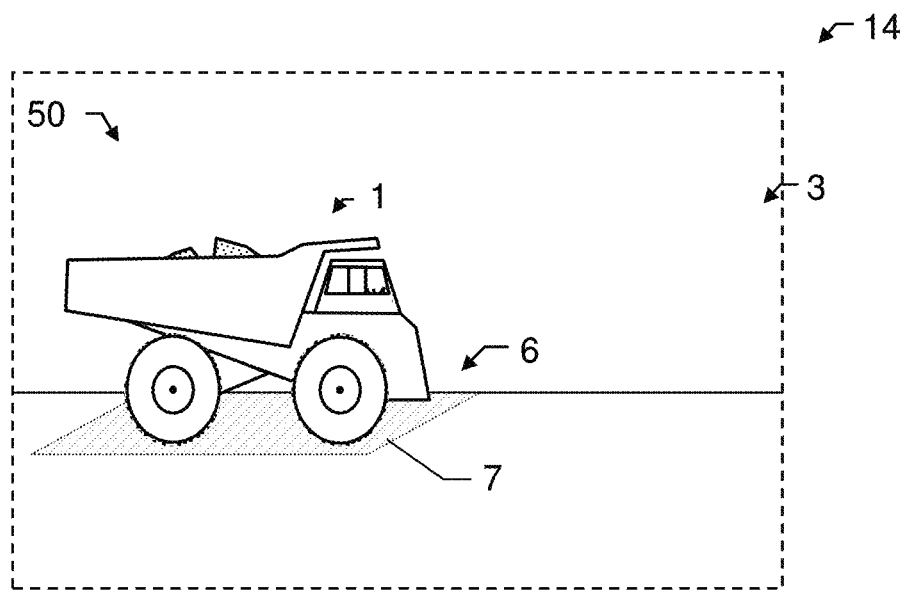

FIGS. 3a and 3b show an improved method according to the invention. Here, the risk zone calculation is additionally based on a live parameter of the mining vehicle 1.

In the example of FIG. 3a, the velocity 9 of the mining vehicle is determined, for instance by transmitting its speedometer data to the augmented reality device or from the image data (deriving speed from at least two subsequent pictures). The risk zone 6 (and its visualization 7) then is adapted to this parameter, in the example in that the risk zone 6 extends in the front resp. moving direction of the mining vehicle 1 more than in its rear.

Optionally, the overlay 7 is adapted to the velocity 9 (or moving direction) of the mining vehicle 1 in that its form or color depends or changes depended on the velocity 9. If foe example the vehicle 1 is moving slowly or moving away from the person, then the overlay 7 is green, if moving fast or towards the person, the overlay 7 is red.

FIG. 3b shows another example. Here, the live parameter is the operating status of the vehicle 1, which is for instance wirelessly transmitted to the augmented reality device. In the example, the vehicle 1 is not operating at all and hence, the risk zone 6 is set to (near-)zero and visualized as a small, only adumbrated overlay 7. Alternatively, no risk zone graphics at all is visualized.

Such a real-time parameter is a parameter of the mining vehicle 1 as a whole as in the examples. Alternatively or additionally, particularly in case of a very huge mining vehicle 1 such as a rotary excavator, the parameter relates only to a part or structure of the mining vehicle, such as cantilever arm, boom, tipper body, front end loader, conveyor belt or platform lift. Analogously, the described dependence of the visualization 7 of the risk zone 6 of a velocity may be one not (only) of the whole vehicle 1, but of one, multiple or all of its (sub-)structures.

Figure 4:
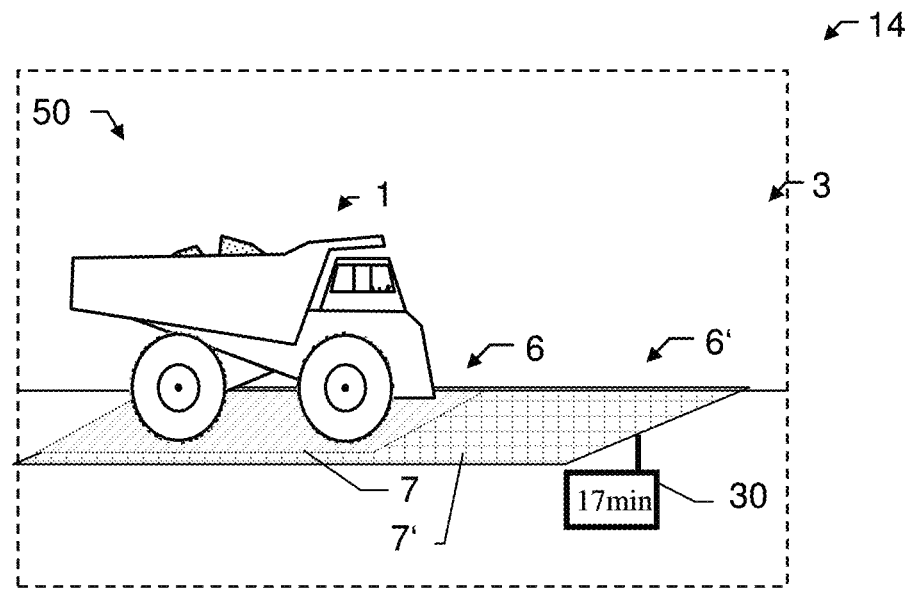
FIG. 4 shows schematically another example of the method according to the invention.

FIG. 4 shows a further improved method according to the invention. Here, a parameter of the mining vehicle 1 is used to calculate and visualize a future risk zone 6'. In the example, compared to the example of FIG. 3b, not only the present operating state (=off) is determined and taken into account, but the future operating state of the mining vehicle 1, too. In the example, it is determined, e.g. by considering a preset time schedule or work flow or an input or the vehicle's operator or a measurement (e.g. the actual percentage of load of the vehicle wherefrom the time till full load is estimated), that the mining vehicle 1 will be operating in 17 minutes. Alternatively, the operator of the mining vehicle 1 actively transmits this information to the augmented reality display device, for example by the way of a central server. Hence, the present (nearly-)zero risk zone 6 will change in 17 minutes in the future risk zone 6', which is already indicated in the example as second overlay 7'. The visualization 7' of the future risk zone 6' may for example be such that the overlay 7' only pops up periodically from time to time to allow a greatest possible free view 3 of the person. The time interval and/or display time may thereby change for example such that the time intervals become shorter and shorter and the display time longer and longer the closer the time of occurrence of the future operating status is. In the example, a text box 30 is additionally displayed on the user's display, indicating the time until the future risk zone 6' will take effect.

Figure 5A:
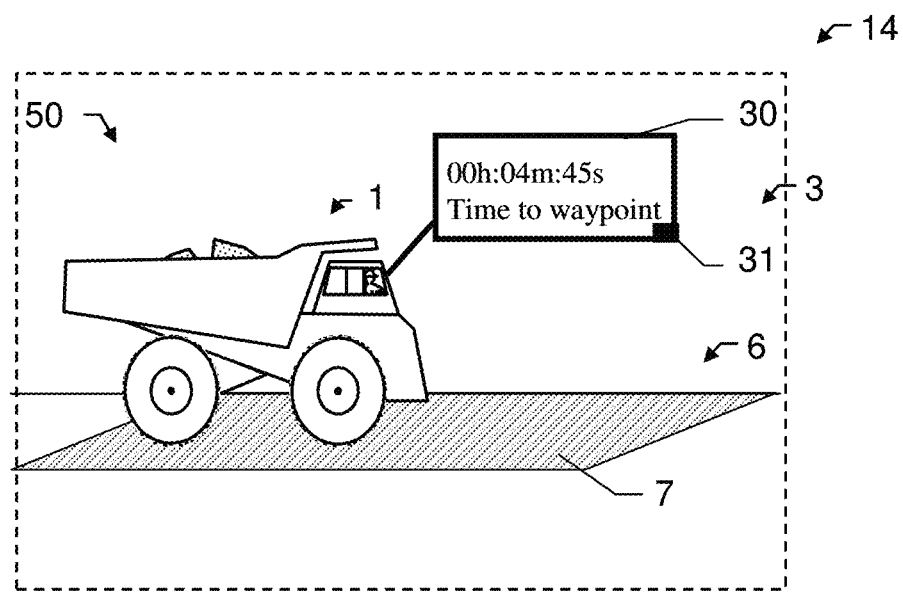
FIGS. 5a-b show schematically two further examples of the method according to the invention.
Figure 5B:
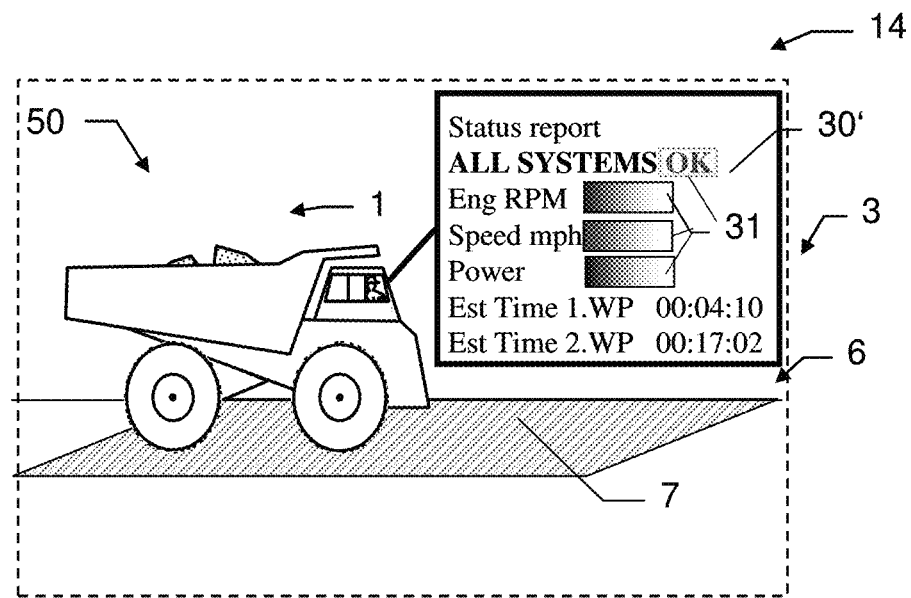

Such a text or info box 30 is optionally used to display further information of the mining vehicle 1 in the person's view 3, for instance information about the health or load factor of the vehicle 1, as illustrated in FIGS. 5a and 5b.

FIG. 5a shows visualization 14 of a risk zone 6 together with an info box 30, whereby the info box 30 shows information about the mining vehicle 1 in form of text and/or graphics. In the example, the time to the next waypoint of the vehicle 1 is visualized on the display in way of augmented reality. The relevant information is directly transmitted from a computer of the mining vehicle 1 to the display device or indirectly through a common server or hub. In the example, the text box 30 has a button 31 shown, which allows interaction of the user, for instance such that that info box 30 is expandable to allow visualization of more or more detailed information of the mining vehicle 1 in the view of the person 3, as shown in FIG. 5b.

FIG. 5b illustrates the augmented view 3 wherein an expanded info box 30' is viewable by the user. In the example a detailed health or status report is given by the info sheet 30' to the person, together with the overlay 7 of the risk zone 6. As some non-concluding examples, the report contains amongst other speed and power information and more detailed waypoint information. In the example, the information graphics are embodied as interactive buttons 31, by pushing which the user can open additional, even more detailed info sheets and/or can give commands as described below.

The interactive component is optionally further upgraded in that the user with the help of the visualizations resp. interactive buttons 31 can give orders to the vehicle 1, for example setting a maximum vehicle speed by touching the corresponding field in the info box 30'. Another example is that the person sets a maximum risk zone or geofence 6 of the mining vehicle 1 using the overlay 7 which for instance triggers an alert if the mining vehicle 1 leaves this risk zone. In other words the user assigns a maximum safe work area to the mining vehicle 1. This is an example in which a supervisor can control the mining vehicle 1 in a certain way with the help of his augmented reality device according to the invention.

Figure 6A:
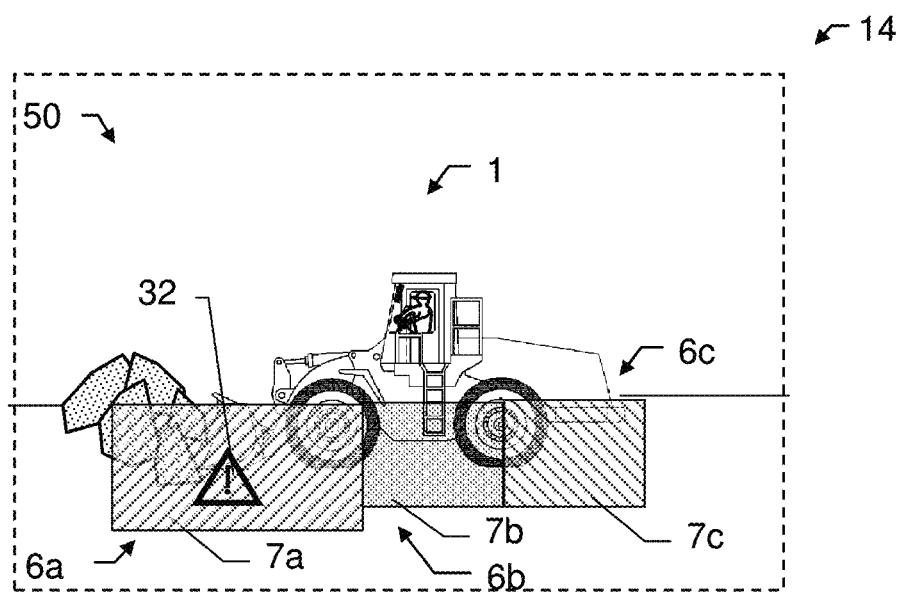
FIG. 6a,b show schematically another examples of the method according to the invention.

FIG. 6a shows another improved method according to the invention. Here, the risk zone of the mining vehicle 1 is divided in three parts 6a, 6b, 6c, visualized by three different overlay 7a, 7b, 7c. The three risk zones 6a-6c are of different risk grades. The risk zone 6b in the middle is of relatively low risk, the risk zone 6c at the rear of the vehicle 1 of high risk (as the vehicle 1 might reverse) and the risk zone 6a in the front as a direct area of operations of the vehicle's bucket of very high risk or even no-go area. In the example, the different risk grades are visually signalized by different forms resp. fillings of the overlays 7a-7c, whereby the very high risk of the risk zone 7a is additionally visually signalized by a warning sign 32.

Figure 6B:
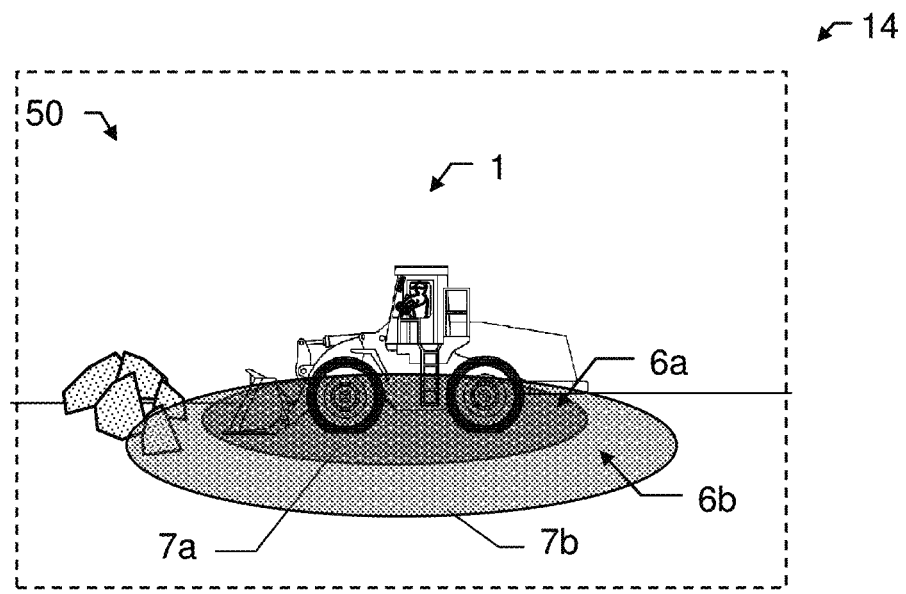

FIG. 6b shows some sort of variant of the example of FIG. 6a. In the example of FIG. 6b, different grades of risks resp. different risk zones or corridors 6a, 6b are visualized by two different overlays 7a and 7b. The inner overlay 7a indicates a high risk zone 6a, the outer overlay 7b a risk zone 6b of lower risk. The two overlays 7a, 7b distinguish from another by color; the high risk is indicated by a flashy color such as red, the lower risk by a more modest color such a yellow. Instead of overlays with clear boundaries resp. clear color or shape or pattern differences, gradients of color or shape or pattern can be used to indicate a varying risk grade, for example from dark red in the middle resp. in the area of highest risk to light red in the outer area of relatively low risk.

Figure 7:
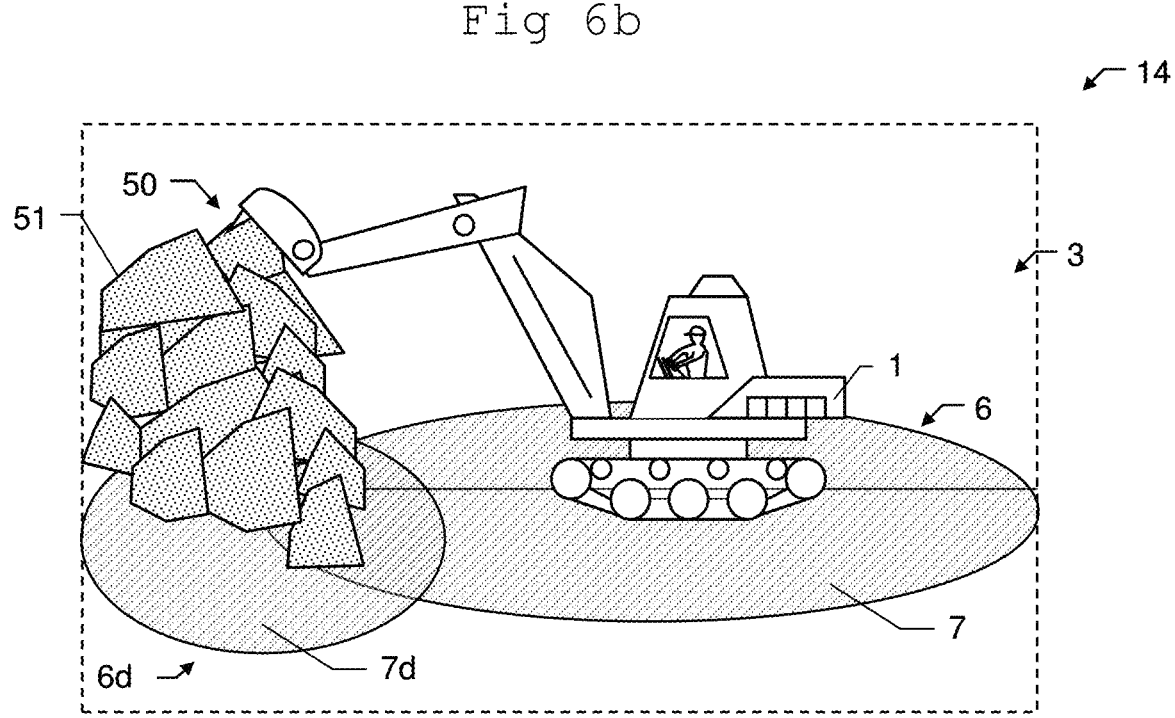
FIG. 7 shows schematically another example of the method according to the invention.

FIG. 7 shows another improved method according to the invention. In this example, an additional risk zone 6d is calculated and visualized as additional overlay 7d in addition to the risk zone 6 of the mining vehicle 1 (cf. FIG. 1e). The additional risk zone 6d results from the operation of the mining vehicle 1. In the present example, rocks of the rock pile 51 pose a threat as the rock pile 51 is worked on by the mining vehicle 1 and rocks may fall down. The visualization 6d of the additional risk zone 7d warns the person of this additional risk on the mining worksite 50, which arises not directly from the mining vehicle 1 itself.

Figure 8:
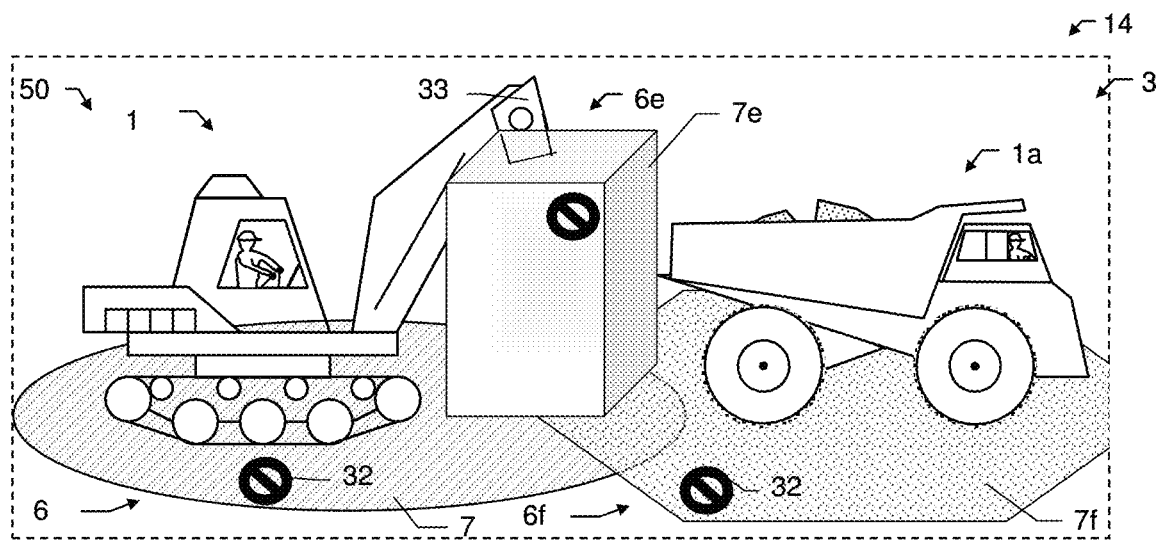
FIG. 8 shows schematically a further example of the method according to the invention.

FIG. 8 shows another improved method according to the invention. In this example, the method comprises coincident or simultaneous calculation and visualization of the risk zone 6 and 6f of multiple or all mining vehicles 1 and 1a in the field of view of the person. Hence, the user is visually informed in the field of all the risk zones or geofences 6, 6f in his field of view or nearby resp. of all areas which might impose a danger. In the example, the overlays 7, 7f of the different vehicles 1, 1f are different for better distinguishing visually the different risk zones. The overlays 7, 7f in the example have different form and pattern. The differentiation of the overlays 7, 7f are with respect to different classes of mining vehicles 1, 1f (such as class of "excavator", class of "tipper truck", class of "bulldozer" or class of "hydraulic shovel"). Alternatively or additionally, the overlays are specific for the individual heavy machinery such that e.g. a first tipper truck has a green risk zone overlay associated and a second tipper truck a yellow risk zone overlay.

In the example of FIG. 8, besides the risk zones 6, 6f relating to the vehicles 1, 17 as a whole, a risk zone 6e of the boom 33 is calculated and visualized as overlay 7e. In the example, the risk zone 6e is calculated in three dimensions and then visualized as a 3D-overlay 7e. Such a 3D-approach is particularly useful if the person is not situated on the same ground level as the mining vehice 1 but for instance looks upon it from some height above or at some angle.

In the present example, each risk zone 6, 6e, 6f is visualized together with an icon 32, representing an interactive button. By "touching" these buttons 32, the user can deactivate the according overlay 7, 7e, or 7f if their visualization if somehow hindering his view of the mining vehicle 1 or the mining site 50 (or vice-versa if not shown from the start active resp. reactivate an according overlay). As a further option, the method comprises automatically checking if such a deactivation is allowable or would impose an impermissible risk to the user, then disabling the user's deactivation option, for example simply by not visualizing an according icon 32. Alternatively or additionally, an overlay 7, 7e, 7f deactivated by the user is automatically reactivated and displayed if a checking routine determines that the underlying risk zone 6, 6e, 6f, afore not standing for a (high) risk now indicates a no longer negligible risk, for example because to a movement of the person and/or the mining vehicle in the time since overlay deactivation.

As another option, an overlay 7, 7f is adapted to the look or appearance of a mining vehicle 1, 1f in the picture taken by the device's camera. If for instance the mining vehicle 1 has a yellow color then a color and/or pattern for the risk zone overlay 7 is selected that fits best to the yellow color of the vehicle 1 to enable viewing of both the overlay 7 and the mining vehicle 1 best as possible. Alternatively or additionally, the visualization of the risk zone 6, 6f is, preferably dynamically, adapted to the vehicle's appearance in that its brightness in the picture (resp. the brightness of the whole image) is taken into account. If for example the image data of the mining vehicle 1, 1f indicate that it is seen relatively dark by the camera resp. the person than the brightness of the overlay 7, 7f is reduced and the other way round.

Alternatively or additionally, not only the risk zone 6, 6f is visualized, but using the extracted image data of the mining vehicle 1, 1f, an image of the mining vehicle 1, if itself is visualized in real time such that the person sees an artificial live view of the mining vehicle on the display of the augmented reality device. Thereby, the image is enhanced by image editing compared to the original camera's picture, for example enhancing brightness or contrast or highlighting the vehicle's contours. This is for instance advantegeous if the real, direct view of the mining vehicle is rather unsatisfying, e.g. due to bad lighting conditions (darkness, out of the sun). Then, the artificial representation of the mining vehicle 1, 1f augments the person's view 3 and provides better visibility of the vehicle 1, even further reducing any risks.

Figure 9A:
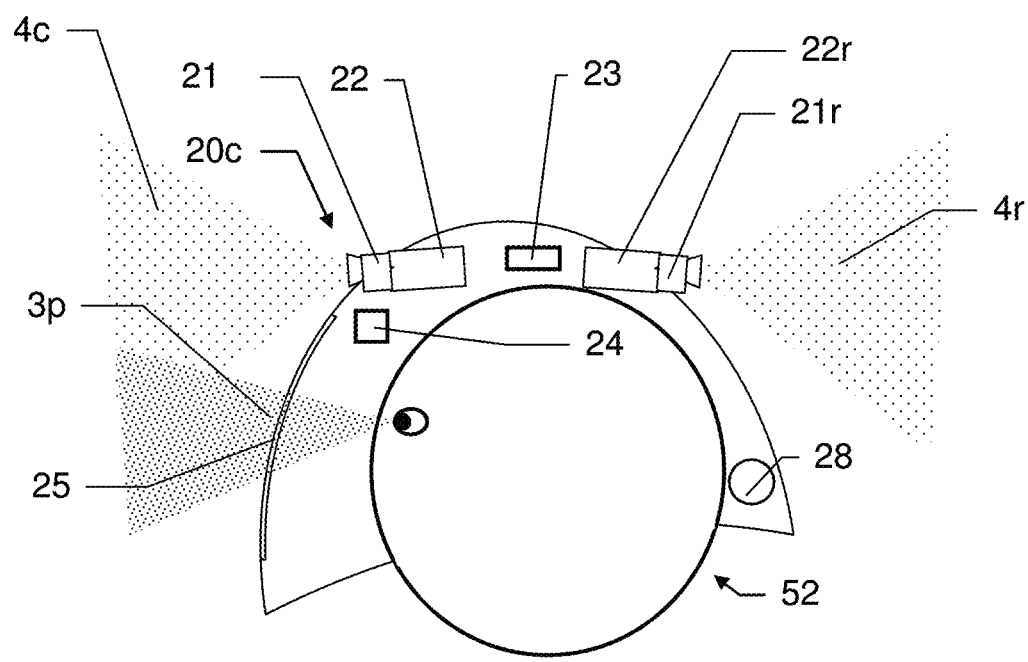
FIG. 9a shows an exemplary embodiment of an augmented reality display device.

FIG. 9a shows a further developed exemplary embodiment of an augmented reality display device 20c worn by the person 52 according to the invention. In addition to the embodiment according to FIG. 2b, the device 20c has an additional camera 21r, the field of view 4r of which is directed to the rear of the person 52 and captures a picture stream of the mining site on the back of the person 52. The AR-device 20c further comprises an image recognition and extraction unit 22r for recognizing a mining vehicle and extraction image data of the mining vehicle captured by the rear camera 21r. The risk zone calculation unit 23 determines at least one risk zone based on the image data of both cameras 21 and 21r and on preset risk zone data and the graphic display unit 24 generates and visualizes a live graphic representation of the risk zones on the display 25. Of course, the device 20c may comprise more than two cameras 21, 21r.

Figure 9B:
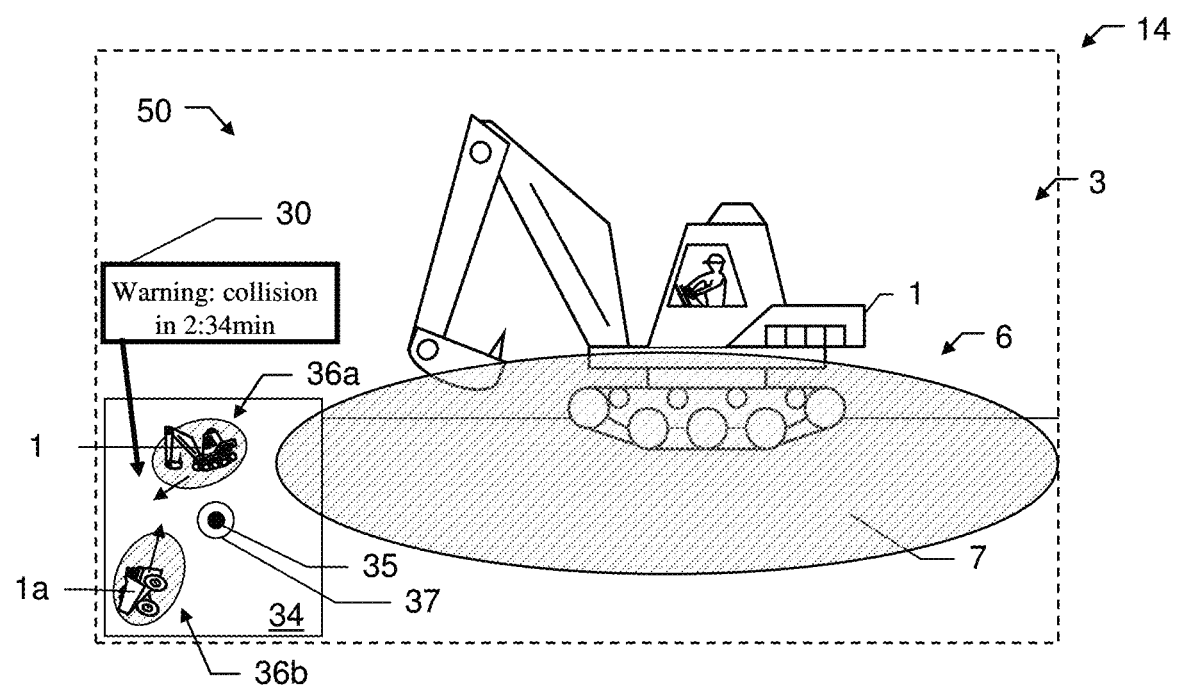

FIG. 9b shows a visualization 14 using an AR-device according to FIG. 9a. In this example, in addition to the visualization as shown in FIG. 1e, based on the picture stream of the front camera (21 in FIG. 9a), a bird's eye view 34 of the person's surrounding is visualized in the lower left side of the display, based on the picture stream of both the front camera and the rear camera (21r in FIG. 9a). The person's position is indicated by point 35 in the middle, whereas a graphic 36a relating to a mining vehicle 1 in the front of the person indicates this mining vehicle 1, the graphic 36a further comprising according first risk zone and an arrow indicates the vehicle's movement (e.g. based on sensor data and/or image stream evaluation as described above). A graphic 36b relates to a second mining vehicle 1a in the back of the person and indicates this second mining vehicle, an according second risk zone, and a second arrow for indicating this second vehicle's movement. Thus, using an additional camera, with the help of the additional overlay 34, the user has a view of the total of his surrounding and the risks due to mining activities. Alternatively to a bird's eye view 34 as shown, the image stream of the rear camera is shown as an overlay comparable to that of the front camera, for example within as a small picture-in-picture fade-in.

In the present example, the bird's eye view 34 comprises an additional geofence 37, visualizing a risk zone or protection zone around the person within which no mining vehicle shall intrude. With the help of the graphic 37, the user can for instance estimate better if a high risk caused by a mining vehicle is present (a mining vehicle inside the geofence 37) or is impending (a mining vehicle moving close to and/or in direction of the geofence 37). As a further add-on, a text box 30 is visualized, showing information about both mining vehicles 1, 1a. In this example, based on velocity measurements (and optionally also based on information about vehicles' shape or size) of both vehicles 1, 1a as described above, a warning is given by info box 30, warning of a (potential) risk zone-overlap or even collision if both vehicles 1, 1a proceed with their current, unchanged course, occurring in 2:34 minutes. This information 30 gives the user, e.g. acting as a supervisor, the opportunity to intervene in the operation of one or both mining vehicles 1, 1a.

Although the invention is illustrated above, partly with reference to some preferred embodiments, it must be understood that numerous modifications and combinations of different features of the embodiments can be made. All of these modifications lie within the scope of the appended claims.

What is claimed is:

1. A method for augmenting a person's current view of a mining vehicle on a mining worksite in real-time, the method comprising:
    capturing with a camera a stream of pictures of the mining worksite with the camera's field of view corresponding at least partly to the person's field of view,
    recognizing at least one mining vehicle in the picture stream by means of image processing,
    extracting image data of the mining vehicle from the picture stream,
    calculating, based on the image data and on preset vehicle risk zone data, at least one risk zone of the mining vehicle adapted to the person's current view of the mining vehicle, and
    visualizing the risk zone on a person's display such that the person's current view of the mining vehicle is overlayed in real-time with a visualization of the risk zone,
    wherein the method comprises a predictive component in that a future risk zone is calculated and visualized based on a parameter of the mining vehicle or the person.

2. The method according to claim 1, wherein recognizing at least one mining vehicle comprises recognizing an individual mining vehicle and the preset vehicle risk zone data is data specific for the individual mining vehicle.

3. The method according to claim 1, wherein calculating a risk zone comprises subdividing the risk zone in subzones of different risk grades, and visualization of a risk zone comprises displaying different subzones with different overlays.

4. The method according to claim 1, further comprising:
    coincident calculation and visualization on the person's display of the risk zones of multiple mining vehicles in the person's current view, wherein the visualization of some or all risk zones is activatable and deactivatable by the person,
    calculating and visualizing of at least one additional risk zone wherein the additional risk zone is resulting from an activity of the mining vehicle,
    additionally visualizing extracted image data of the mining vehicle such that an artificial live view of the mining vehicle is visualized on the display, and
    communicating with the mining vehicle using information visualized on the display.

5. A method for augmenting a person's current view of a mining vehicle on a mining worksite in real-time, the method comprising:
    capturing with a camera a stream of pictures of the mining worksite with the camera's field of view corresponding at least partly to the person's field of view,
    recognizing at least one mining vehicle in the picture stream by means of image processing,
    extracting image data of the mining vehicle from the picture stream,
    calculating, based on the image data and on preset vehicle risk zone data, at least one risk zone of the mining vehicle adapted to the person's current view of the mining vehicle, and
    visualizing the risk zone on a person's display such that the person's current view of the mining vehicle is overlayed in real-time with a visualization of the risk zone, wherein recognizing at least one mining vehicle comprises recognizing a class of mining vehicle and the preset vehicle risk zone data is class specific data.

6. An augmented reality display device adapted for augmenting a person's current view of a mining vehicle on a mining worksite in real-time, the device comprising:

at least one camera for capturing a stream of pictures, the camera being aligned such that the camera's field of view corresponds at least partly to the person's field of view, an image recognition and extraction unit that is adapted to recognize a mining vehicle in the picture stream by means of image processing and to extract image data related to the mining vehicle from the picture stream, a risk zone calculation unit that is adapted to determine, based on the image data and on preset vehicle risk zone data, at least one risk zone of the mining vehicle adapted to the person's current view of the mining vehicle, a graphic display unit that is adapted to create and visualize a graphics of the risk zone on a display of the device and to overlay the graphics in real time on the person's current view of the mining vehicle, a detector for determining the position and/or orientation of the device relative to the mining vehicle, a user interface adapted to enable the person to interact with information, particularly the risk zone, visualized on the display, an additional camera for capturing a stream of pictures, the additional camera being aligned such that the camera's field of view is substantially different from the person's field of view, and a wireless communication unit for communication with the mining vehicle.

7. A computer program product comprising a non-transitory machine readable medium having program code which is stored on the non-transitory machine-readable medium, the program code being configured to control and carry out the method according to claim 1.

\* \* \* \* \*